United States Patent [19]

Matsumoto

[11] Patent Number: 4,839,823
[45] Date of Patent: Jun. 13, 1989

[54] AUTOMATIC TROUBLE ANALYSIS APPARATUS AND METHOD THEREOF

[75] Inventor: Yoshihiro Matsumoto, Tokyo, Japan
[73] Assignee: Kabushiki Kaisha Toshiba, Kawasaki, Japan
[21] Appl. No.: 230,723
[22] Filed: Aug. 10, 1988

Related U.S. Application Data

[63] Continuation of Ser. No. 838,608, Mar. 11, 1986, abandoned.

[30] Foreign Application Priority Data

Mar. 20, 1985 [JP] Japan ................................. 60-56527

[51] Int. Cl.$^4$ ...................... G06F 15/46; G06F 11/30
[52] U.S. Cl. .................................... 364/513; 364/554; 364/550
[58] Field of Search ............... 364/550, 551, 552, 554, 364/513, 492, 495

[56] References Cited

U.S. PATENT DOCUMENTS

| | | | |
|---|---|---|---|
| 3,731,070 | 5/1973 | Urban | 364/431.02 |
| 4,591,983 | 5/1986 | Bennett et al. | 235/385 |
| 4,593,367 | 6/1986 | Slack et al. | 364/513 |
| 4,628,435 | 12/1986 | Tashiro et al. | 364/468 |
| 4,632,802 | 12/1986 | Herbst et al. | 364/513 |
| 4,641,248 | 2/1987 | Suzuki et al. | 364/492 |
| 4,642,782 | 2/1987 | Kemper et al. | 364/550 |
| 4,644,479 | 2/1987 | Kemper et al. | 364/554 |
| 4,649,515 | 3/1987 | Thompson et al. | 364/513 |
| 4,658,370 | 4/1987 | Erman et al. | 364/513 |
| 4,675,829 | 6/1987 | Clemenson | 364/513 |

FOREIGN PATENT DOCUMENTS 2083258 3/1982 United Kingdom .

OTHER PUBLICATIONS

Pattern Recognition Letters, vol. 2, No. 6, 12/84. pp. 427-432, Elsevier Science Publishers B.V., Amsterdam, NL; H. Ogawa et al., "An Expert System for Structure Damage Assessment".
Seisan Kenkyu, vol. 34, No. 7 (1982): An Extension of Dempster and Shafer's Theory to Fuzzy Set for Constructing Expert Systems, by M. Ishizuka, Jul. 1982, pp. 86-89.
Seisan Kenkyu, vol. 35, No. 9 (1983): Another Extension of Dempster and Shafer's Theory to Fuzzy Set for Constructing Expert Systems, by M. Ishizuka, Sep. 1983, pp. 90-92.

*Primary Examiner*—Parshotam S. Lall
*Assistant Examiner*—S. A. Melnick
*Attorney, Agent, or Firm*—Oblon, Fisher, Spivak, McClelland & Maier

[57] ABSTRACT

In a trouble analysis apparatus, a cause of an accident which is empirically and statistically obtained, and a plurality of effects corresponding to the cause are entered in advance at a keyboard and stored as a data base in a magnetic disk unit. In this case, a sum of basic probabilities of the plurality of effects for the cause is set to be 1. A pre-processor calculates as upper (or lower) probability of a subset of the result by using the Dempster & Shafer probability theory. The pre-processor uses the upper or lower probability to create Fuzzy membership functions, and also creates a hypothetical proposition for corresponding the Fuzzy membership function and the cause. An inference engine matches accident phenomena with the effects when an accident occurs and infers the cause by a modified Fuzzy inference method using the hypothetical proposition.

2 Claims, 8 Drawing Sheets

| CAUSE | BASIC PROBA-BILITY | ELEMENT WITHIN SUBSET | | | | SUBSET NAME |
|---|---|---|---|---|---|---|
| FAULT OF FEEDER 1L ONLY | 0.98 | a1 | | a3 | | A1 |
| | 0.01 | a1 | | | a4 | A2 |
| | 0.0044 | a1 | a2 | | | A3 |
| | 0.0044 | a1 | | | | A4 |
| | 0.0001 | a1 | a2 | a3 | a4 | A5 |
| | 0.0001 | a1 | a2 | a3 | | A6 |
| | 0.0001 | a1 | a2 | | a4 | A7 |
| | 0.0001 | | | a3 | a4 | A8 |
| | 0.0001 | | a2 | a3 | a4 | A9 |
| | 0.0001 | | a2 | | a4 | A10 |

FIG. 5

| FACILITY NAME | SYMBOL | FACILITY | STATIC INFORMATION | | | DYNAMIC INFORMATION | | | |
|---|---|---|---|---|---|---|---|---|---|
| | | | SOURCE SIDE END SIDE CB | SIDE CB | BRANCH CB | CURRENT | VOLTAGE | PARA/ NON-PARA | TRIP/ NON-TRIP |
| ... ABC ... | ... XY-L1 ... | ... 220 KV TRANS- MISSION LINE ... | X-20CB1 | Y-20CB1 | NON | ... 650 ... | ... 216 ... | ... PARA ... | ... 1 ... |

| OPERATIONAL EQUIPMENT TYPE : TWIN-LEAD TYPE FEEDER | | | | | | | | | | |
|---|---|---|---|---|---|---|---|---|---|---|
| TYPE OF ACCIDENT | BASIC PROBA-BILITY | OPERATION STATUS OF LOGICAL SWITCH AND PROTECTIVE RELAY | | | | | | | | |
| | | LA1 | LA2 | LB1 | LB2 | BT | TA1 | TA2 | Ln1 | Ln2 |
| FAULT OF FEEDER 1L | 0.9 | 1 | 0 | 1 | 0 | 0 | 0 | 0 | 0 | 0 |
| | 0.01 | 1 | 0 | 0 | 1 | 0 | 0 | 0 | 0 | 0 |
| | 0.01 | 1 | 1 | 0 | 0 | 0 | 0 | 0 | 0 | 0 |
| | 0.01 | 0 | 0 | 1 | 0 | 1 | 1 | 0 | 0 | 0 |
| | 0.01 | 0 | 0 | 1 | 0 | 0 | 1 | 1 | 0 | 0 |
| | 0.01 | 0 | 1 | 1 | 0 | 1 | 1 | 0 | 1 | 0 |
| | 0.01 | 0 | 1 | 1 | 0 | 0 | 1 | 1 | 1 | 1 |
| | 0.01 | 0 | 1 | 1 | 0 | 1 | 1 | 0 | 0 | 1 |
| | 0.01 | 0 | 0 | 1 | 0 | 1 | 1 | 0 | 1 | 0 |
| | 0.01 | 1 | 1 | 1 | 0 | 0 | 0 | 0 | 0 | 0 |
| | 0.01 | 1 | 0 | 1 | 1 | 0 | 0 | 0 | 0 | 0 |
| FAULT OF FEEDER 2L | 0.9 | 0 | 1 | 0 | 1 | 0 | 0 | 0 | 0 | 0 |
| | 0.01 | 0 | 1 | 1 | 0 | 0 | 0 | 0 | 0 | 0 |

FIG. 10

| OPERATIONAL EQUIPMENT TYPE | TWIN-LEAD TYPE FEEDER | | | | | | | | |
|---|---|---|---|---|---|---|---|---|---|
| TYPE OF ACCIDENT | BASIC PROBABILITY | OPERATION STATUS OF LOGICAL SWITCH AND PROTECTIVE RELAY | | | | | | | |
| | | LA1 | $\overline{LA1}$ | LA2 | $\overline{LA2}$ | LB1 | $\overline{LB1}$ | LB2 | $\overline{LB2}$ |
| FAULT OF FEEDER 1L | 0.9 | 1 | | 1 | | | 1 | | 1 |
| | 0.01 | 1 | | | 1 | 1 | | | 1 |
| | 0.01 | | 1 | | 1 | 1 | | 1 | |
| | 0.01 | | | 1 | | | 1 | | 1 |
| | 0.01 | | | 1 | | | 1 | 1 | |
| | 0.01 | | 1 | 1 | | 1 | | | |
| | 0.01 | | 1 | 1 | | | 1 | | 1 |
| | 0.01 | | 1 | 1 | | 1 | | 1 | |
| | 0.01 | | | 1 | | | 1 | | |
| | 0.01 | 1 | | 1 | | | | | 1 |
| | 0.01 | 1 | | | 1 | | | | 1 |
| FAULT OF FEEDER 2L | 0.9 | | 1 | | 1 | | | | |
| | 0.01 | | 1 | 1 | | | | | |

AUTOMATIC TROUBLE ANALYSIS APPARATUS AND METHOD THEREOF

This application is a continuation of application Ser. No. 838,608, filed on Mar. 11, 1986, now abandoned.

DEFINITION OF TERMS trouble, accident, failure: A deviation of the operational performance of the system from the specified condition to result in inability or abnormality of the system.

fault: A deviation of the state of devices or equipments from the specified condition which will cause trouble, accident or failure of the system including those devices or equipments.

logical switch: an integral assembly of a switch or switches and a breaker or breakers, i.e., a set of a switch or switches and a breaker or breakers connected through wires which never branch to a third facility or facilities.

operational logical switch: If all of the switches and breakers which constitute a logical switch are closed, the logical switch is operational.

tripped logical switch: When some fault occurs, the circuit breaker of an operational logical switch may open its contact by the tripping action of the protective relay which is connected to the circuit breaker. The logical switch including the tripped circuit breaker is called a tripped logical switch.

facility: A unit or a component which is used to configure electric power network. A transformer, a logical switch, a transmission line, and a bus are examples of the facility.

operational facility: The facility which is transferring electric current.

tripped facility: The facility which was operational before any of the electric power system took place, and has become in-operational, where "in-operational" means that the facility is not transferring electric current.

operational facility type, operational equipment type: A typical pattern which designates a class of connection between operating facilities or operating equipments which constitute a portion of the objective electric power network, where the objective network means the network including faults and being put into observation in order to analyze fault.

engine: computer which is designed so as to furnish some specific function.

facilities (equipments) which constitute electric power network: A facility or equipment is a self-contained unit which is used as an independent component to constitute electric power network.

Mode of fault, Fault mode: Classification to identify the nature of the fault. Example: Phase A Grounding, Phase A-B Short Circuit.

Cause-effect pair: A relationship connecting a cause and the effect which is brought by the cause.

Grade of Fuzzy set: Grade of Fuzzy set A for u is defined by $\mu_A(u)$, where u is an element of set A, and $\mu_A$ is a number valued for the range between 0 and 1, which represents the degree of u's participation to A.

Subset of operational equipment type: If A set of equipments which are included in an operational equipment type is S, a subset of S means a partial set of S.

Fuzzy upper probability: The probability defined by equation (3).

Fuzzy lower probability: The probability defined by equation (2).

Fuzzy membership function: The function which generates the grade for every element which is included in the Fuzzy set.

Mode of failure, mode of accident: Classification to identify the nature of the fault or accident. Example: Transmission-line 1L is stopped.

Focal element: When $m(Ai) > 0$ in equation (1), Ai is called focal element.

Rules used for approximate inference: Approximate inference is the reasoning to produce approximate values as the result of reasoning.

mini-max: a class of operation used in the calculation between two matrices.

Modus ponens: Assume that we have an implication that "if P is true, then Q is true". Modus ponens is the statement that if P is true for this implication, Q is true.

Modus tollens: Assume that we have an implication that "if P is true, then Q is true". Modus tollens is the statement that if Q is false for this implication, P is false.

Dempster's combination rule: The rule defined by Dempster which is used to combine two hypothesis.

Protective zone: Range of the facilities which are protected by the protective relay.

combining rule: The rule to be used to combine a multiple number of hypotheses.

BACKGROUND OF THE INVENTION

The present invention relates to an apparatus and method for automatic accident analysis in an electric power system, wherein fault locations and their modes which identify the initiating disturbance and any device misoperations can be automatically inferred by a computer, using experience data and a subjective judgment input by an operator, in equipment constituting a power system.

Several computer-aided inference systems for analyzing accidents in a power system have been proposed. In general, these systems are called expert systems and use a knowledge base. In most of these conventional systems, empirical knowledge is expressed in the form of a so-called "production rule". More specifically, the expression "if accident X occurs, then fault H has occurred" is employed as a production rule. A computer receives a post-accident phenomenon and calculates one or plural fault locations and fault modes by using the knowledge base. Fault modes in a power system include three-phase short-circuiting, two-phase short-circuiting, one-phase grounding, multi-phase grounding, device misoperation and the like.

An accident cannot always be accurately/reliably defined (with certainty), and a production system cannot always reliably determine a relationship between the cause and effect of an accident. For example, an arc resistance difference for grounding at the same location changes relay operation. Uncertain elements also exist which cause non-operation or erroneous-operation of relays and circuit breakers. When these uncertain elements are considered, it is impossible to express the cause-and-effect relationship in a definite production rule.

In order to eliminate this drawback, many improvements have been made. According to one improved method, certainty factor is added to each production rule. More specifically, this method adapts a form "if accident X occurs, probability that fault H has occurred A". In this form, "A" is called a certainty factor. Extensive studies have been made to define certainty factor A.

The Bayesian probability is widely used as a definition of certainty factor A. However, it cannot express "subjectively uncertain" knowledge. (The main criticism regarding the use of the Bayesian probability to express subjective uncertainty is that it cannot be used to deal with ignorance in an effective manner. In other words, the Bayesian theory cannot distinguish between belief and disbelief.) Assume that certainty factor A is 0.6. According to the Bayesian probability, the above assumption is expressed by the following production: "If phenomenon X occurs, a probability that accident H has occurred 0.6, and a probability that accident H has not occurred is 0.4."

Most practical way of expressing uncertainty is: "If accident X occurs, the probability or belief that fault H has occurred is 0.6, and the probability for ignorance is 0.4."

SUMMARY OF THE INVENTION

It is an object of the present invention to provide an apparatus and method for automatic accident analysis in an electric power system automatically calculating predicted fault locations and their modes, with a weighted probability, by entering accident phenomena into the operation when an accident with unknown fault location and mode occurs.

According to the accident analysis method of the present invention, the Dempster & Shafter probability theory is combined with the Fuzzy theory to quantitatively infer subjective uncertainty regarding an accident. In addition, as a result of such inference, possible fault locations and fault modes are presented with weighted probabilities as references for operator consideration and decision.

In order to achieve the above object of the present invention, there is provided an apparatus for monitoring an accident occurring in an electric power system including at least logical switches and protective relays, on the basis of a Dempster & Shafer theory and a Fuzzy theory, wherein, assuming that elements constituting a phenomenon occurring in the electric power system are $A_i$ ($i=1, 2, \ldots$) which is a subset of a whole set $A_0 = \{a_1, a_2, \ldots a_n\}$, where $a_1, a_2, \ldots a_n$ represent states of logical switches or protective relays, the Dempster & Shafer theory defines the following:

basic probability $m(A_i)$ is $$m(\phi) = 0$$
$$\sum_{A_j \; A_0} m(A_i) = 1;$$
($\phi$: empty set), and, when relationship $m(A_i) > 0$ stands, lower probability $P_*(A_i)$ is $$P_*(A_i) = \sum_{A_j \; A_i} m(A_j)$$

and upper probability $P^*(A_i)$ is $$P^*(A_i) = 1 - P_*(\overline{A_i})$$
$$= 1 - \sum_{A_j \; \overline{A_i}} m(A_j);$$

and, assuming that a whole set is $U \{u_1, u_2, \ldots, u_n\}$, where $u_i$ ($i=1, 2, \ldots n$) is any one of lower probability $P_*(A_i)$ and upper probability $P^*(A_i)$, and the Fuzzy set is F, the Fuzzy set defines the following:

$$F = \sum_{1}^{n} \{\mu F(u_i)/u_i\} = \mu F(u_1)/u_1 + \mu F(u_2)/u_2 + \ldots \mu F(u_n)/u_n$$

where $\mu F(u_i)$ is the grade of $u_i$ in a membership function of U; "/" is the separator, and "+" means "or"; when propositions represented by
  Compound Proposition: if (X is ) then (y is G) and
  Propositions: (x is F') are given, y is G' for $G' = F'o[(F \times G) \cup (\overline{F} \times V)]$ is inferred by the generalization of modus ponens, where each of F and F' is Fuzzy set in U and each of G and G' is Fuzzy set of V, which is a set of $v_1, v_2, \ldots v_m$, where $v_j$ ($j=1, 2, \ldots m$) represents a cause of failure, said apparatus comprising:
  means for operating said electric power system in operating equipment types including
  (1) Balanced-type dual-feeder system,
  (2) Radial feeder system,
  (3) Single feeder,
  (4) Double bus,
  (5) Single bus,
  (6) Transformer,
  (7) Center point grounding,
  (8) Power-factor improvement and stabilizing equipment,
  (9) 3-terminal balanced-type dual-feeder system, and
  (10) 3-terminal single feeder;

first means for detecting operating conditions of said logical switches and said protective relays;

second means for creating a first list which lists, for each of said operating equipment types, cause/effect relationships including a plurality of causes of accidents that are empirically obtained, a plurality of effects associated with said causes, and basic probabilities of the respective effects, a sum of the basic probabilities being equal to 1; for creating a second list which lists logical switches and protective relays whose operating conditions have changed during time period t1 after detection of an accident; for creating a third list which lists logical switches and protective relays which are regarded as being associated with the accident among from those listed in said second list, when the occurrence of the accident is confirmed; for determining an operating equipment type of said electric power system from the logical switches and protective relays that are listed in said third list, and creating a fourth list in which names of logical switches of facilities that are regarded as being associated with the accident are related with those of logical switches of the operating equipment type as determined; for calculating any one of upper and lower probabilities for the cause/effect relationship listed in said first list, using the Dempster & Shafer theory, and producing a membership function; and for performing approximate reasoning by the use of the Fuzzy theory, on the names of the logical switches of the determined operating equipment type, using the membership function, to thereby infer facilities associated with the accident.

According to the present invention, the following effects can be obtained.

(i) Since fault determination can be performed in a short period of time, early system restoration can be achieved.

(ii) The experience data of the cause/effect relationship regarding a user accident such as shown in FIG. 8, for example can be expressed with a basic probability (the sum of basic probabilities in units of causes is 1) given to the effect. The effect with the basic probability is input to the computer, thereby enabling the computer to infer. Therefore, experience data of an operator can be easily expressed, and probability expressions can be produced.

(iii) A discrimination output is displayed together with a Fuzzy set membership grade representing probability data for the operator.

BRIEF DESCRIPTION OF THE DRAWINGS

Other objects and features of the present invention will be apparent from the following description taken in connection with the accompanying drawings, in which:

FIG. 5 is a table showing an equipment data base stored in a magnetic disk unit in FIG. 4;

FIG. 10 is a table showing a modification of the cause/effect relationships (FIG. 8) associated with the accident.

DETAILED DESCRIPTION OF THE PREFERRED EMBODIMENTS

Prior to a description of the preferred embodiments of the present invention, its principle will first be described.

The Dempster & Shafer probability theory, established by A. P. Dempster and G. Shafer, is used to properly express "ignorance". This theory is suitable for expressing subjective uncertainty included in the cause/effect relationship of an accident and a fault and what caused the accident. According to the present invention, the Dempster & Shafer theory is used to calculate upper or lower probabilities for each cause/effect relationship. These upper or lower probabilities are then used to create Fuzzy set membership functions of the Fuzzy set for each cause. An accident (fault location and mode) are inferred in accordance with an approximate Fuzzy inference.

Figures 1, 2:
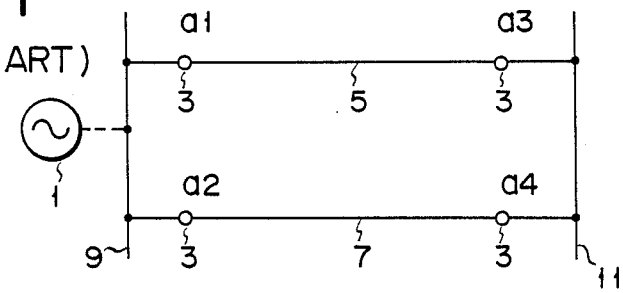
FIG. 1 is a diagram showing a balanced two-feeder operational equipment type exemplifying conventional operational equipment types.
FIG. 2 is a table for explaining the concept of subsets in a balanced-type dual-feeder operational equipment type shown in FIG. 1.

Assume that elements constituting an accident of a system of interest are a1 to a4, and a set thereof is $A0 = \{a1, \ldots, a4\}$. FIG. 1 illustrates a balanced dual-feeder system. Elements a1 to a4 are logical switches. Each logical system is a set consisting of a circuit breaker and two disconnecting switches, namely A and B, connected to one another in a manner that disconnecting switch A is connected to one end of the circuit breaker and disconnecting switch B is conneced to the other end of the circuit breaker. The lead connecting switches have no branch point to which leads to connect other equipment are tied. If a subset of set A0 is given as Ai (i=1, 2, ... ) and its basic probability as m(Ai), the following conditions are satisfied in accordance with the Dempster & Shafer probability theory:

$$m(\phi) = 0 \quad (\phi: \text{empty set}) \\ \sum_{Ai \, A0} m(Ai) = 1 \quad \quad (1)$$

These conditions are applied to a balanced-type dual-feeder system shown in FIG. 1 as follows. The balanced-type dual-feeder system consists of power source 1, logical switch 3, transmission lines 5 and 7, power source end bus 9, and load bus 11. Various faults in the balanced-type dual-feeder system can be assumed. FIG. 2 is a table showing predictive phenomena based on empirical subjectivity of operators when an accident occurs in one feeder. The values in the first line of the table, for example, can be read such that "a probability of accident that breaks the circuit by operating elements a1 and a3 upon occurrence of fault in feeder 1L is 0.98".

The second and subsequent lines can be read in the same manner as described above. Some lower items are omitted in the table in FIG. 2. A sum of values in the basic probability columns for an identical fault must be 1. FIG. 2 shows the basic probabilities for a single fault. In fact, however, basic probabilities m(Ai) for satisfying equations (1) are calculated for all accidents.

If m(Ai)>0, Ai is called a focal element. For example, in FIG. 2, subset A1={a1, a3} can be defined as a focal element.

For the focal element, in addition to the definition of the basic probability described above, lower and upper probabilities are defined as follows:

$$\text{Lower probability } P_*(Ai) = \sum_{Aj \, Ai} m(Aj) \quad (2)$$

$$\text{Upper probability } P^*(Ai) = 1 - P_*(\overline{Ai}) = 1 - \sum_{Aj \, \overline{Ai}} m(Aj) \quad (3)$$

Equations (2) and (3) will be described with reference to the table in FIG. 2. The lower and upper probabilities of subset {a1, a3} are given below, provided that items not listed in the table are represented by "...":

$$P_*(\{a1, a3\}) = m(\{a1\}) + m(\{a3\}) + m(\{a1, a3\})$$
$$= 0.0044 + 0 + 0.98 + \ldots$$
$$P^*(\{a1, a3\}) = P_*(\{a1, a3\}) + m(A2) + m(A3) + m(A4) + m(A5) + m(A6) + m(A7) + m(A8) + m(A9)$$
$$= 0.98 + 0.01 + 0.0044 + 0.0044 + 0.0001 + \ldots$$

The lower and upper probabilities of a subset consisting of only a single element have identical values.

The feature associated with the Fuzzy theory according to the present invention will be described briefly.

If whole set U{u1, u2, ..., un} is given, Fuzzy set F for proposition P is defined as follows:

$$F = \sum_{1}^{n} \{\mu F(ui)/ui\} = \mu F(u1)/u1 + \mu F(u2)/u2 + \ldots \mu F(un)/un \quad (4)$$

where $\mu F(ui)$ is the grade of ui in a membership function of U.

The example in FIG. 2 is defined by:
Proposition: "A fault occurs in only feeder 1L"
Whole set U: {a1, a2, a3, a4}
Whole set V: ($v_1$, $v_2$, $v_3$) (the definitions of $v_1$, $v_2$, $v_3$ are represented by equation (9))

Now assume that the following propositions are established for sets U and V:
Proposition 1: x is F in U
Proposition 2: y is G in V F and G are Fuzzy sets for corresponding propositions. A Fuzzy set for a compound hypothetical proposition using propositions 1 and 2 is calculated as follows:
Compound proposition: if (x is F) then (y is G)
Fuzzy set: →(F×G)∪($\overline{F}$×V)

According to the approximate inference rules, an actual inference is performed in the following manner:

$$\begin{array}{ll} \text{Compound proposition:} & \text{if } (x \text{ is } F) \\ & \text{then } (y \text{ is } G) \\ & \rightarrow (F \times G) \cup (\overline{F} \times V) \\ \text{Proposition:} & (x \text{ is } F') \\ & \rightarrow F' \end{array} \quad (5)$$

When these two propositions are given, the following proposition can be inferred by the generalization of modus ponens:

y is G'
for $G' = F'o[(F \times G) \cup (\overline{F} \times V)]$ (6)

$$\begin{array}{ll} \text{Compound proposition:} & \text{if } (x \text{ is } F) \\ & \text{then } (y \text{ is } G) \\ & \rightarrow (F \times G) \cup (\overline{F} \times V) \\ \text{Proposition:} & (y \text{ is } G'') \end{array} \quad (7)$$

When these two propositions are given, the following propositions can be inferred by the generalization of modus tollens:

(x is F'')

for $F'' = [(F \times G) \cup (\overline{F} \times V)]oG''$ (8)

According to the features of the present invention, the Dempster & Shafer theory and the Fuzzy theory are combined for accident analysis in the following manner.

Assume balanced-type feeders 1L and 2L as shown in FIG. 1. A set for all possible faults is defined as V, and G is defined as a Fuzzy set for accident y.

Elements of set V for the balanced-type dual-feeder system are given:

$$\left.\begin{array}{l} V_1\text{: fault within feeder 1L} \\ V_2\text{: fault within feeder 2L} \\ V_3\text{: fault across feeders 1L and 2L} \end{array}\right\} \quad (9)$$

A set for the logical switches in the balanced-type dual-feeder system is given as U, and a Fuzzy set regarding the switch state after a fault occurs is given as F. The elements is set U regarding the balanced-type dual-feeder system are logical switches. The logical switches that make up set U are those which are tripped due to the fault.

Membership functions for Fuzzy sets F and G are given as $\mu F$ and $\mu G$, respectively. In whole sets U{u1, u2, ... uM} and V{v1, v2, ... vN}, M is the total number of logical switches assumed to the operated in association with the accidents in the balanced-type dual-feeder system, and N is the total number of fault types in the balanced-type dual-feeder system shown in equation (9).

Degree $\mu F$ (ui) of element ui (i = 1, 2, ... M) is upper probability P*({ui}) of subset {ui} derived from equations (2) and (3) using the Dempster & Shafer probability theory. Even if degree $\mu F$(ui) is the lower probability, the same value is presented.

In order to calculate P*({ui}) (i = 1, 2, ... M), the basic probability table in FIG. 2 must be created either empirically or statistically.

Degree $\mu G(v_j)$ of element $v_j$ (j = 1, 2, ... N) is empirically and statistically determined during formation of the basic probability table.

When x, y, F and G are defined as described above, the following hypothetical proposition can be given:
In the balanced-type dual-feeder system, if (logical switches {u1, u2, ... uM} are operated)

then (fault {v1, v2, ... vN} occurs) (10)

Various fault types ($v_1$, $v_2$, ... $v_n$) for set V of the balanced-type dual-feeder system can be considered. Composite hypothetical propositions for possible fault, like proposition (10), are obtained.

In the above description, a balanced-type dual-feeder system is exemplified. However, this system is only one of the operation patterns in a power system. Each equipment, prior to the occurrence of an accident, is operated on the basis of several operation patterns. For example, one feeder is operated together with another feeder to constitute a balanced-type dual-feeder system or a radial feeder system. In addition, one feeder can be operated as a single feeder.

These operation patterns are called operational equipment types.

The operational equipment types are:
(1) Balanced-type dual-feeder system
(2) Radial feeder system
(3) Single feeder
(4) Double bus
(5) Single bus
(6) Transformer
(7) Center point grounding
(8) Power-factor improvement and stabilizing equipment
(9) 3-terminal balanced-type dual-feeder system
(10) 3-terminal single feeder Assignment of real equipment to each corresponding equipment within one of these operational equipment types is made.

When an accident occurs, a minimum scope of the equipments which seem to be included possible fault point are determined in accordance with the protective actions of the switches and the protective relays.

Figure 3:
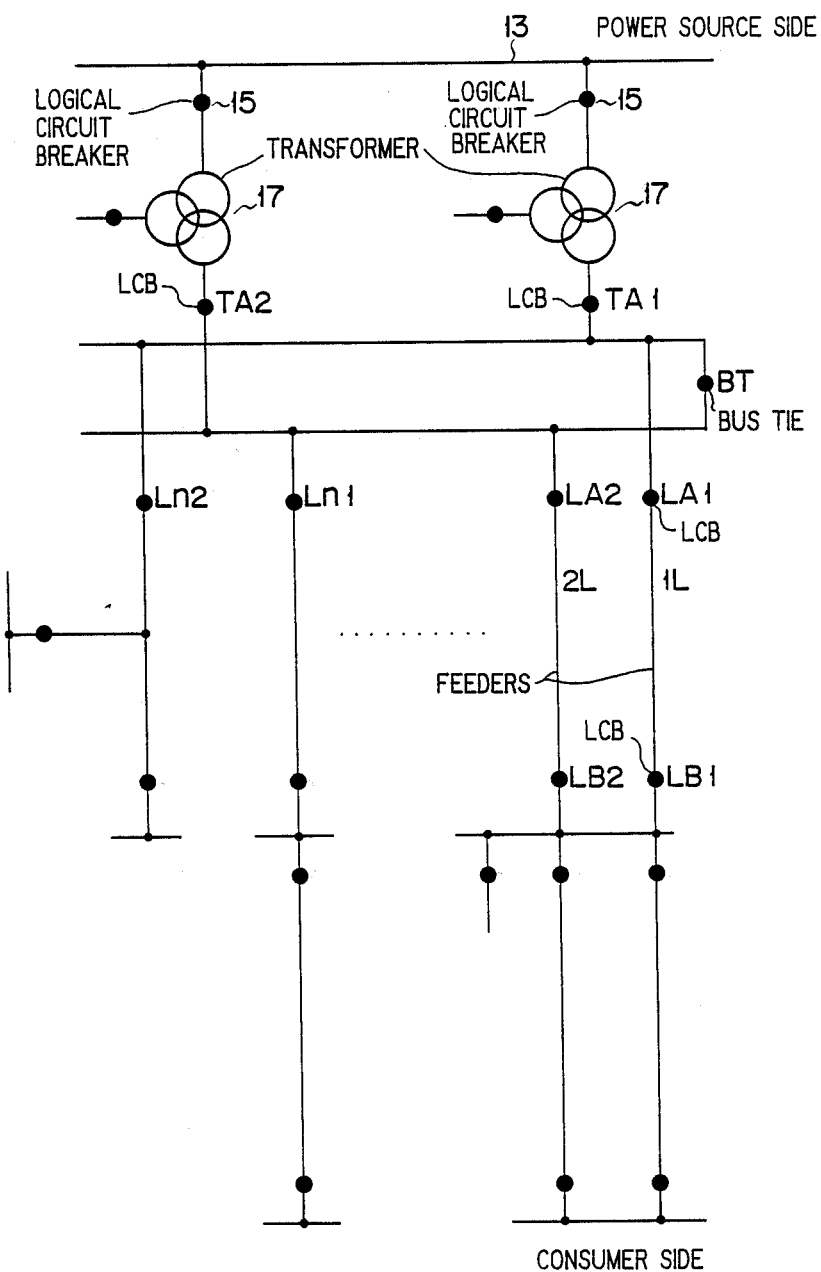
FIG. 3 is a diagram of a power system employing the present invention.

FIG. 3 is a diagram showing a class of power system employing the present invention. The power system includes logical switch 15, transformers 17, logical switches TA1 and TA2 connected to the secondary windings of transformers 17, bus tie BT for connecting feeders 1L and 2L, logical switches LA1 at the power source side on feeder 1L, logical switch LA2 at the power source side on feeder 2L, logical switch LB1 at the consumer side on feeder 1L, and logical switch LB2 at the consumer side on feeder 2L.

Assume that a fault occurs in feeder 1L or 2L or in both feeders 1L and 2L. In this case, feeders 1L and 2L are used to constitute a balanced-type dual-feeder system. A minimum operational equipment type is the balanced-type dual-feeder system illustrated in FIG. 1. Correspondences between the logical switch names are given as follows:

LA1→a1
LA2→a2
LB1→a3
LB2→a4

When the fault occurs, TA1 and TA2 may sometimes be operated in addition to $a_1, a_2 \ldots a_4$. According to the embodiment of the present invention, events which may occur with equipment excluded from the minimum operational equipment type are excluded from the consideration. However, when TA1 and TA2 are significant factors in accident discrimination, TA1 and TA2 need only to be included in the balanced-type dual-feeder system which is an example of another operational equipment type. This problem does not impair the main feature of the present invention in that even the minimum operational equipment type can discriminate the accident.

The compound positions expressed in equation (10) are prepared by the number of possible combinations of operational equipment types and the types of faults in each equipment type.

For example, in the balanced-type dual-feeder system in FIG. 1, if the following conditions are given:

v1: fault in only 1L
v2: fault in only 2L
v3: fault in both 1L and 2L
u1: logical switch a1
u2: logical switch a2
u3: logical switch a3
u4: logical switch a4
$\mu G(v1) = 1$
$\mu G(v2) = 0$
$\mu G(v3) = 0$
$\mu F(u1) = 0.9980$
$\mu F(u2) = 0.0002$
$\mu F(u3) = 0.9970$
$\mu F(u4) = 0.0024$ a Fuzzy set in equation (10) can be obtained by equation (7) as follows:

$$(F \times G) \cup (F \times V) = \begin{pmatrix} 0.9980 & 0.0020 & 0.0020 \\ 0.9998 & 0.9998 & 0.9998 \\ 0.9970 & 0.0030 & 0.0030 \\ 0.9976 & 0.9976 & 0.9976 \end{pmatrix} \quad (11)$$

The left side of equation (11) corresponds to $[(F \times G) \cup (F \times V)]$ in the right side of equation (6).

If an accident occurs to operate switchs a1 and a3, and a Fuzzy set in equation (6) is expressed as follows:

$\mu F'(u1) = 1$ $\mu F'(u2) = 0$ $\mu F'(u3) = 1$ $\mu F'(u4) = 0 \quad (12)$ then G' in equation (6) for the first compound proposition can be expressed as follows:

$$\begin{aligned} \mu G'(v1) &= 0.9980 & \ldots & \text{ probability for an accident in only } 1L \text{ (first proposition)} \\ \mu G'(v2) &= 0.0030 & \ldots & \text{ probability for an accident in only } 2L \text{ (second proposition)} \\ \mu G'(v3) &= 0.0030 & \ldots & \text{ probability for an accident in both } 1L \text{ and } 2L \text{ (third proposition)} \end{aligned} \quad (13)$$

This concludes that when logical switches a1 and a3 are operated, it is probable that the accident has occurred only in feeder 1L.

Similarly, approximate inferences for F' can be performed for other compound hypothetical propositions to obtain a set corresponding to G' from the inference rules, thereby allowing a total final decision.

Equation (11) is computed for each of first, second and third propositions. Then, the matrix values obtained by equation (11) are applied to the second term in right side of equation (6), and furthermore, the respective values in equation (12) are applied to the first term thereof. As a result of equation (6), set G' for the second and third compound propositions are obtained. The results of those computations for this example are as follows:

$\mu G'(v1) = 0.9980$
$\mu G'(v2) = 0.0030$
$\mu G'(v3) = 0.0030$ $$\begin{aligned} \mu G'(v1)' &= 0.4750 \\ \mu G'(v2)' &= 0.1235 \\ \mu G'(v3)' &= 0.0025 \\ \mu G'(v1)'' &= 0.2310 \\ \mu G'(v2)'' &= 0.1138 \\ \mu G'(v3)'' &= 0.0010 \end{aligned} \quad (14)$$

Note that FIG. 2 shows only the cause/effect relationships for the first proposition, but similar cause/effect relationships for the second (accident in only 2L) and third (accident in only 3L) propositions follow easily.

A total decision is allowed for each vj (j=1, 2, and 3) in accordance with Dempster's associative law.

For example, as for v1, the probability of an accident in only 1L is given as 0.9980, 0.4750, and 0.2310, and the probability of an accident not in only 1L is given as 0.0030, 0.0030, 0.1235, 0.0025, 0.1138, and 0.0010 in accordance with the compound proposition. These figures are applied to Dempster's associative law to obtain the probability for each vj.

A practical process of the above-mentioned principle will now be described.

In the operation state of the power system, data immediately preceding the latest state, i.e., occurrence of an accident for the logical switches and protective relays is stored in an equipment data base (FIG. 4) in a magnetic disk unit. This can be achieved by periodically receiving data which are transmitted through a telemeter.

[Processing 1]

When an accident and a series of subsequent phenomena occur, e.g., when the trip of a logical switch is detected and the trip of other logical switches is not detected within a time range of t1 seconds after detecting the first accident, names of logical switches which are tripped and operated protective relays are listed. A list of the tripped logical switch names (logical names) is called a CB list, and a list for operated relay names (logical names) is called an RY list. The times (clock times) at which the phenomena has occurred are filed in the CB and RY lists. In other words, CB list and RY list only record names of logical switches whose statuses are tripped, and operated protective relays which are tripped or operated during a period of t1 seconds after detecting the first accident.

[Processing 2]

All possible equipment names associated with the accident are selected using items in the CB and RY lists, since the protective zone of each relay in the RY list is checked one by one. The equipment located within the protective zones surrounded by the logical switches included in the CB list, which assumed to be associated with the accident, are included in an FA list.

[Processing 3]

The pre-accident operational equipment types included in the FA list are determined in accordance with the pre-accident connection states of that equipment. This operation is required since the connections between equipments change dynamically depending on each day's requirements. At the same time, logical switch names associated with those equipments are matched with the operational equipment type names.

[Processing 4]

When the above processing is completed, the approximate Fuzzy inference is performed for each real equipment component matched to the operational equipment type, and thereby, a fault (an accident location and its mode) is inferred.

The computer automatically executes processing 1 to processing 4 in the order named. Processing 4 can be repeatedly performed when the accident estimation is performed stepwise. For example, when the computer infers that an accident has occurred in 1L and then further inference is required, the following operations are performed. The operating states of the elements for set U are given as the logical switches, and more detailed fault types for 1L fault are given for set V. When the same approximate Fuzzy inference as in processing 4 is performed for all operational equipment types, detailed accident inference can be detected.

Figure 4:
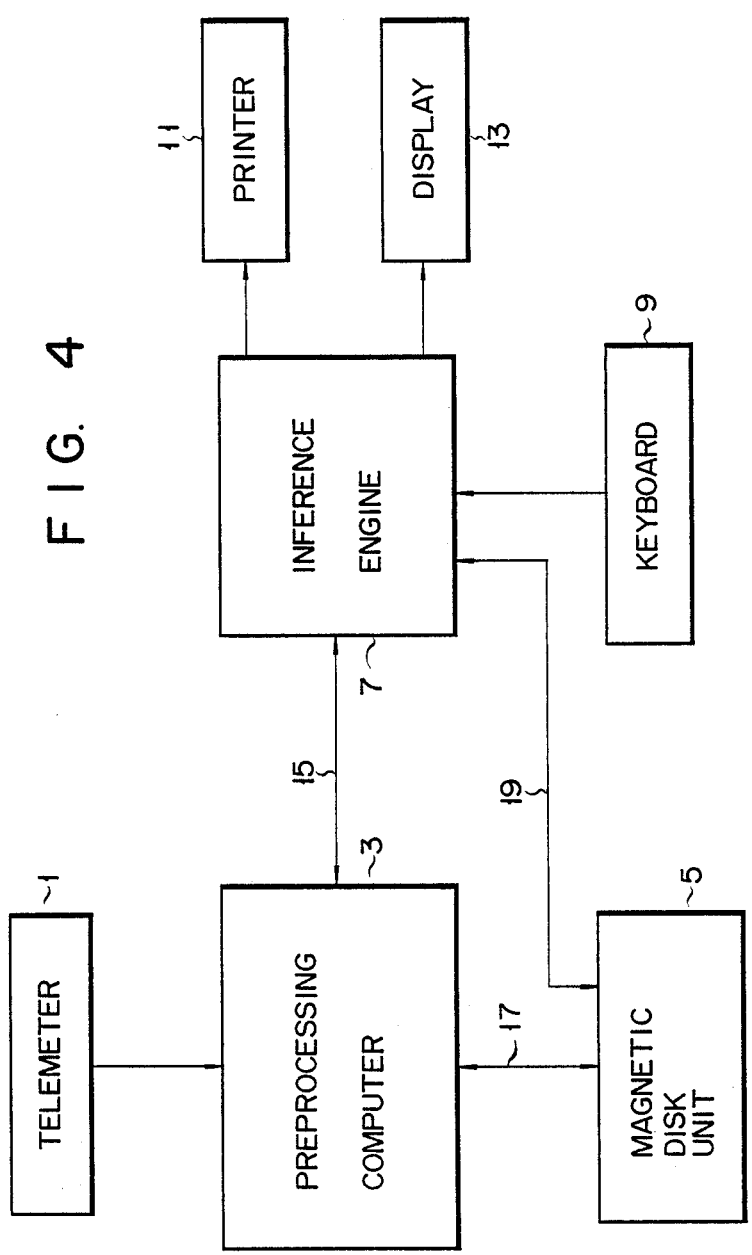
FIG. 4 is a block diagram of an accident analysis apparatus according to an embodiment of the present invention.

FIG. 4 is a block diagram of a trouble analysis apparatus according to an embodiment of the present invention. Telemeter 1 periodically receives data associated with the relevant system. This data includes dynamic data (FIG. 5) such as ON/OFF states of the switches and protective relays, and analog control valus, and accident data if an accident occurs. An output from telemeter 1 is connected to the input of pre-processing computer3. Computer 3 is further connected to magnetic disk unit 5 via cable 17, and to inference engine 7 through data transfer unit 15. Computer 3 is constituted by, for example, a mini computer which periodically fetches data from telemeter 1 and stores the input data in a data base created in unit 5. Unit 5 stores the CB list for the switch names and the RY list for the relay names. Unit 5 also stores the FA list for equipment names supposed to be associated with the accident, and an RL list obtained by adding the correspondences between the real logical switch names and the operational equipment type logical switch names to the FA list. The RL list stored in magnetic disk unit 5 is supplied to inference engine 8 through cable 19. Engine 7 is connected to keyboard unit 9 as an input device and, as output devices; printer 11 and display unit 13. Computer 3 discriminates whether the values from telemeter 1 indicate a normal or accident state with reference to the CB and RY lists. Computer 3 sets "0" for the normal input element and "1" for the abnormal input element. Elements having a value of "1" determine a range of equipment which are related to the possible fault (pre-stored in unit 5). For example, when several protective relays are operated, the range can be determined using their protective zones (pre-stored in unit 5). As a result, computer 3 creates the list (i.e., the FA list) of equipment names included in the range.

Approximate Fuzzy inference propositions are created for all operational equipment types (1) to (10), as previously described. Computer 3 assigns equipment included in the FA list to any one of the operational equipment types. This assignment operation is performed in accordance with their pre-accident states. When assignment is completed, the real logical switch names associated with the actual power network are matched with the operational equipment type logical switch names. For example, in the power system in FIG. 3, assume that feeders 1L and 2L are operated in a balanced state and an accident occurs in the equipment. In this case, the operational equipment type of the balanced-type dual-feeder system is given in FIG. 1. The switch names are assigned as follows:

| Real Logical Switch Name | → | Operational Equipment Type Logical Switch Name |
| --- | --- | --- |
| (LA1, LA2, LB1, LB2) | | (a1, a2, a3, a4) |

A list (i.e., the RL list) including both the FA list and name correspondences is thus created. In the RL list, the operational equipment types and correspondences between the real apparatuses and the operational equipment type apparatus names are listed. In addition, the post-accident states of the respective apparatuses are listed in the RL list.

Figure 6:
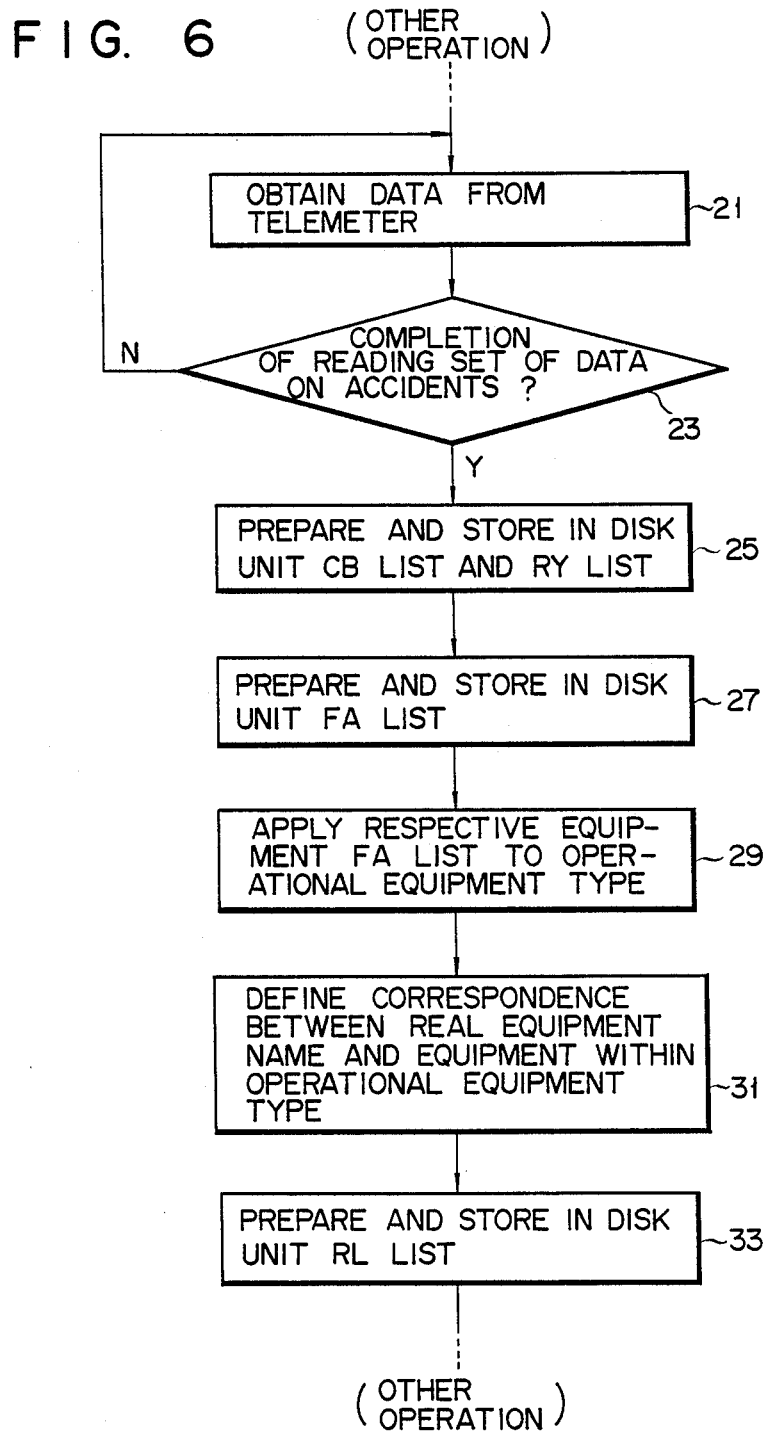
FIG. 6 is a flow chart of a control program executed by a preprocessing unit in FIG. 4.

The operation of the power system described above will be described with reference to the flow charts in FIGS. 6 and 7. FIG. 6 shows the processing flow of computer 3, and FIG. 7 shows the processing flow of engine 7.

In step 21 in FIG. 6, computer 3 periodically receives the equipment states sent from telemeter 1 and determines whether an accident has occurred. If an accident occurs, the computer repeatedly receives data on the accident until reading the set of data is completed, in step 23. When the set of data is completely received, computer 3 prepares the list (CB list) of the operated logic switches and the list (RY list) of the operated protection relays, and stores the CB and RY lists in unit 5. In step 27, the list (FA list) of equipment usually associated with the accident is created in accordance with the content of the CB and RY lists and is stored in unit 5. In step 29, the correspondence between the real equipment and the operational equipment types is determined. In step 31, the logical switch names of the real equipment are matched with those of the corresponding operational equipment type. In step 33, the RL list is created and stored in unit 5. When inference engine 7 is run by computer 3 through line 15, engine 7 translates the cause/effect table (FIG. 8) previously entered at keyboard 9 and uses composite rules to generate membership functions. In addition, engine 7 fetches the RL list stored in unit 5 and performs the approximate Fuzzy inference using the membership functions. The inference results are output to display unit 13 or printer 11.

Figure 7:
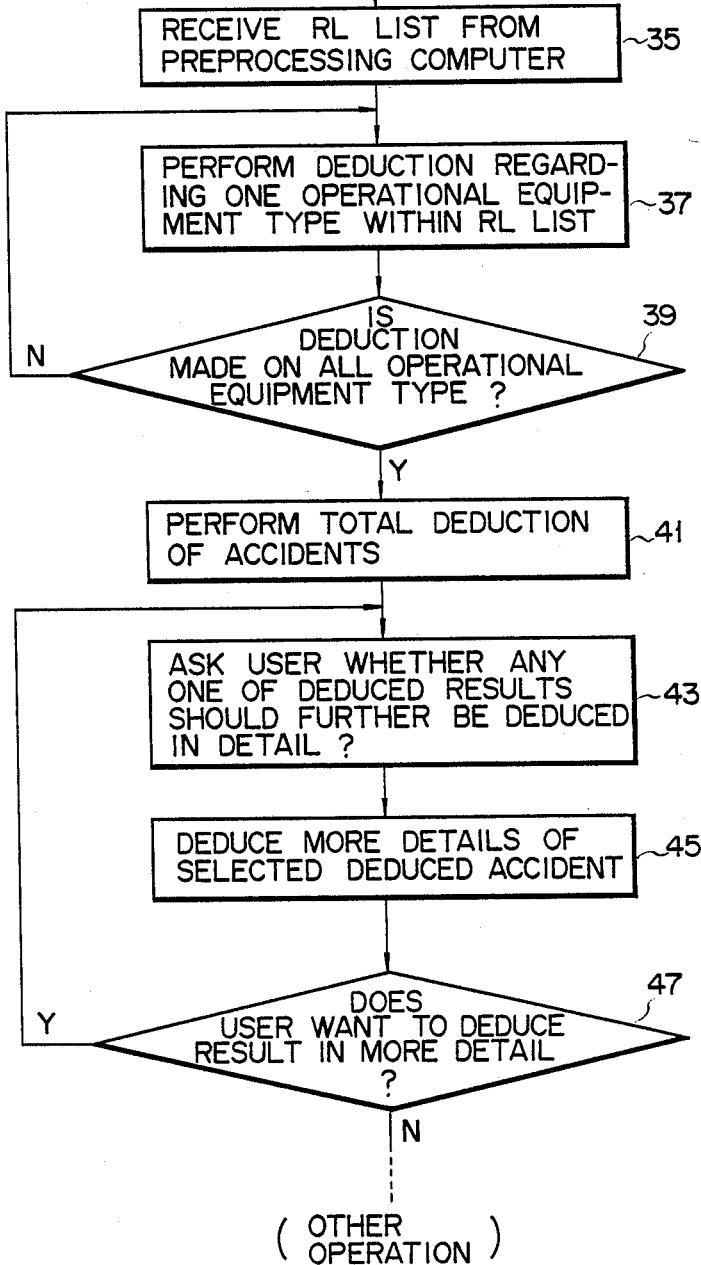
FIG. 7 is a flow chart of a control program executed by an interference engine in FIG. 4.

FIG. 7 is a flow chart explaining the operation of engine 7. In step 35, engine 7 accesses the RL list from unit 5, sequentially fetches specific operational equipment types (indicating that the correspondence with the real equipment is established), and performs the approximate Fuzzy inference using equations (5) and (6) (step 37). When the inference for all equipment included in the RL list is discriminated by engine 7 to complete (step 39), grades of Fuzzy sets for the types of faults are calculated. In step 41, engine 7 systematically derives a final answer (i.e., a fault location and its mode). If further detailed components of the answer are required (step 43), necessary inference rules and apparatus information are selected to perform inferences again (steps 45 and 47). In the case of the power system, faulty equipment is inferred on the basis of the logical switch data. Subsequently, the protection relay data is added to infer a fault mode, non-operation, or erroneous operation thereof.

The source program list below details steps 37 and 45 in FIG. 6 in the Basic language. The same program can be used in steps 37 and 45. In the source list, pages 26 through 28 (steps 620 through 1570) represents the main body of the program regarding steps 37 and 45. Pages 25 and 26 (steps 10 through 610) lists a program for setting data as an example to explain the program effect of the main body program. Pages 29 and 30 show the results of program execution of the main body program upon data setting in the data setting program.

```
10      '*****The value setting for the demonstration of
        Fuzzy reasoning*****
20      MAXI%=3    'maximum number of causes
30      MAXJ%=3    'maximum number of cases for each cause
40      MAXK%=4    'maximum number of consequential items
50      DIM FAULT$(MAXI%)           'names of the fault
60      DIM CASE$(MAXI%,MAXJ%)      'names of the case
70      DIM ELM$(MAXK%)             'names of the consequential
                                     item
80      DIM PRBTY!(MAXI%,MAXJ%)     'probability values for the
                                     cases
90      'YN! is a string of binary values to show if each
        consequence has happened or not
100     DIM YN!(MAXI%,MAXJ%,MAXK%)
110     'G! is a string of membership grades to represent
        characteristics of each cause
120     DIM G!(MAXI%, MAXI%)
130     'FPRI! represents a string of membership grades of
        consequential items which is the input to the reasoning
        execution.
140     DIM FPRI!(MAXK%)
150     '*******test data for demonstration*******
160     '                     I1--->              <---I3
170     '                     a1         L1        a3
180     '                    ---( )--------------------( )---
190     'power source---|                L2                   |---end
200     '                    ---( )--------------------( )---
210     '                     a2                    a4
220     '                     I2--->              <---I4
230     DATA "L1FAIL", "L2FAIL", "L1L2FAIL"
240     READ FAULT$(1),FAULT$(2),FAULT$(3)
```

```
250 DATA "al:tripped", "a3:tripped", "a2:tripped", "a4:tripped"
260 READ ELM$(1),ELM$(2),ELM$(3),ELM$(4)
270 DATA "CASE11", 0.985, 1.0, 1.0, 0.0, 0.0
280 READ CASE$(1,1),PRBTY!(1,1),YN!(1,1,1),YN!(1,1,2),
    YN!(1,1,3),YN!(1,1,4)
290 DATA "CASE12", 0.01, 1.0, 1.0, 1.0, 0.0
300 READ CASE$(1,2),PRBTY!(1,2),YN!(1,2,1),YN!(1,2,2),
    YN!(1,2,3),YN!(1,2,4)
310 DATA "CASE13", 0.005, 1.0, 1.0, 0.0, 1.0
320 READ CASE$(1,3),PRBTY!(1,3),YN!(1,3,1),YN!(1,3,2),
    YN!(1,3,3),YN!(1,3,4)
330 DATA "CASE21", 0.985, 0.0, 0.0, 1.0, 1.0
340 READ CASE$(2,1),PRBTY!(2,1),YN!(2,1,1),YN!(2,1,2),
    YN!(2,1,3),YN!(2,1,4)
350 DATA "CASE22", 0.01, 1.0, 0.0, 1.0, 1.0
360 READ CASE$(2,2),PRBTY!(2,2),YN!(2,2,1),YN!(2,2,2),
    YN!(2,2,3),YN!(2,2,4)
370 DATA "CASE23", 0.005, 0.0, 1.0, 1.0, 1.0
380 READ CASE$(2,3),PRBTY!(2,3),YN!(2,3,1),YN!(2,3,2),
    YN!(2,3,3),YN!(2,3,4)
390 DATA "CASE31", 0.840, 1.0, 1.0, 1.0, 1.0
400 READ CASE$(3,1),PRBTY!(3,1),YN!(3,1,1),YN!(3,1,2),
    YN!(3,1,3),YN!(3,1,4)
410 DATA "CASE32", 0.07, 1.0, 1.0, 1.0, 0.0
420 READ CASE$(3,2),PRBTY!(3,2),YN!(3,2,1),YN!(3,2,2),
    YN!(3,2,3),YN!(3,2,4)
430 DATA "CASE33", 0.07, 1.0, 0.0, 1.0, 1.0
440 READ CASE$(3,3),PRBTY!(3,3),YN!(3,3,1),YN!(3,3,2),
    YN!(3,3,3),YN!(3,3,4)
450 '*****degrees of overcurrent for I1*****
460 G!(1,1)=.998   'in L1 failure
470 G!(2,1)=.355   'in L2 failure
480 G!(3,1)=.413   'in the failure of both L1 and L2
490 '*****degrees of overcurrent for I2*****
500 G!(1,2)=.355   'in L1 failure
510 G1(2,2)=.998   'in L2 failure
520 G!(3,2)=.413   'in the failure of both L1 and L2
530 '*****degree of overcurrent for I1 and I2*****
540 G!(1,3)=.413   'in L1 failure
550 G!(2,3)=.413   'in L2 failure
560 G!(3,3)=.986   'in the failure of both L1 and L2
570 '*****input value setting for the demonstration*****
580 FPRI!(1)=1!
590 FPRI!(2)=1!
600 FPRI!(3)=0!
610 FPRI!(4)=0!
620 '****************************************************
630 '***** Program Source List for Fuzzy Reasining *****
640 '****************************************************
650 '------------
660 '------------
670 '*******calculation of membership grade for each
      cause*******
680 DIM F!(MAXI%,MAXK%)
690 DIM NF!(MAXI%,MAXK%)
700 FOR I=1 TO MAXI%
```

```
710     LPRINT "Dempster/Shafer's probability for ";FAULT$(I);"
        is"
720     FOR K=1 TO MAXK%
730       F!(I,K)=0!
740       FOR J=1 TO MAXJ%
750         F!(I,K)=F!(I,K)+PRBTY!(I,J)*YN!(I,J,K)
760       NEXT J
770       NF!(I,K)=1!-F!(I,K)
780       PRINT F!(I,K)
790         LPRINT F!(I,K)
800     NEXT K
810     PRINT "------"
820       LPRINT "------"
830   NEXT I
840   '*******calculation of the implication matrix*******
850   DIM FXG!(MAXK%,MAXI%)   'the result which is got when
                              matrix F is multiplied by matrix G
860   DIM NFXV!(MAXK%,MAXI%)  'the result which is got when
                              matrix not-F is multiplied by
                              matrix V
870   DIM GANI!(MAXI%,MAXK%,MAXI%)     'this is the
                                       implication matrix
880   DIM RES!(MAXI%,MAXK%,MAXI%)
890   DIM SRES!(MAXI%,MAXI%)
900   DIM FRES!(MAXI%)
910   FOR I=1 TO MAXI%
920     PRINT "The implication matrix for ";FAULT$(I);" is"
930     LPRINT "The implication matrix for ";FAULT$(I);" is"
940     FOR N=1 TO MAXI%
950       FOR M=1 TO MAXK%
960         IF F!(I,M)<G!(I,N) THEN FXG!(M,N)=F1(I,M)
                               ELSE FXG!(M,N)=G!(I,N)
970       NEXT M
980     NEXT N
990     FOR N=1 TO MAXI%
1000      FOR M=1 TO MAXK%
1010        NFXV!(M,N)=NF!(I,M)
1020      NEXT M
1030    NEXT N
1040    FOR N=1 TO MAXI%
1050      FOR M=1 TO MAXK%
1060        IF FXG!(M,N)>=NFXV!(M,N) THEN GANI!(I,M,N)=FXG!(M,N)
                                     ELSE GANI!(I,M,N)=NFXV!(M,N)
1070        PRINT GANI!(I,M,N)
1080        LPRINT GANI!(I,M,N)
1090      NEXT M
1100      PRINT "----------------"
1110      LPRINT "----------------"
1120    NEXT N
1130    PRINT "*********************"
1140    LPRINT "*********************"
1150  NEXT I
1160  '*******calculation for obtaining mini-max*******
1170  FOR I=1 TO MAXI%
1180    FOR N=1 TO MAXI%
1190      FOR M=1 TO MAXK%
```

```
1200     IF FPRI!(M)<GANI!(I,M,N) THEN RES!(I,M,N)=FPRI!(M)
                                 ELSE RES!(I,M,N)=GANI!(I,M,N)
1210     NEXT M
1220     SERS!(I,N)=RES!(I,1,N)
1230     FOR M=2 TO MAXK%
1240       IF RES!(I,M,N)>SRES!(I,N) THEN SRES!(I,N)=RES!(I,M,N)
1250     NEXT M
1260   NEXT N
1270 NEXT I
1280 FOR N=1 TO MAXI%
1290   PRINT "Reasoned grade for ";N;"th parameter of the
             cause is"
1300   LPRINT "Reasoned grade for ";N;"th parameter of the
             cause is"
1310   FOR I=1 TO MAXI%
1320     PRINT SRES!(I,N);" this is reasoned by rule ";I
1330     LPRINT SRES!(I,N);" this is reasoned by rule ";I
1340   NEXT I
1350 NEXT N
1360 '*******calculation of match between reasoned grades and
     cause membership grades for each cause*******
1370 DIM MATCH!(MAXI%,MAXI%)
1380 FOR I=1 TO MAXI%
1390   FOR X=1 TO MAXI%
1400     MATCH!(I,X)=0!
1410     FOR Y=1 TO MAXI%
1420       MATCH!(I,X)=MATCH!(I,X)+(G!(X,Y)-SRES!(I,Y))^2
1430     NEXT Y
1440     MATCH!(I,X)=1!-SQR(MATCH!(I,X)/MAXI%)
1450     PRINT "The match between the result from rule ";I;"
             and cause ";X;" is "MATCH!(I,X)
1460     LPRINT "The match between the result from rule ";I;"
             and cause ";X;" is "MATCH!(I,X)
1470   NEXT X
1480 NEXT I
1490 '*******calculation by applying Dempster's rule of
     combination*******
1500 FOR N=1 TO MAXI%
1510 FRES!(N)=MATCH!(1,N)*MATCH!(2,N)*MATCH!(3,N)
1520 FRES!(N)=FRES!(N)+MATCH!(1,N)*MATCH!(2,N)*
   (1!-MATCH!(3,N))+MATCH!(1,N)*MATCH!(3,N)*(1!-MATCH!(2,N))
1530 FRES!(N)=FRES!(N)+MATCH!(1,N)*(1!-MATCH!(2,N))*
     (1!-MATCH!(3,N))+MATCH!(2,N)*(1!-MATCH!(1,N))*
     (1!-MATCH!(3,N))+MATCH!(3,N)*(1!-MATCH!(1,N))*
     (1!-MATCH!(2,N))
1540   PRINT "Dempster's combined possibility for ";FAULT$(N);"
             is ";FRES!(N)
1550   LPRINT "Dempster's combined possibility for ";FAULT$(N);"
             is ";FRES!(N)
1560 NEXT N
1570 END
Dempster/Shafer's probability for L1FAIL is
 1
 1
 .01
 .005
------
```

Dempster/Shafer's probability for L2FAIL is
.01
.005
1
1
------
Dempster/Shafer's probability for L1L2FAIL is
.9799999
.9099999
.9799999
.9099999
------

The implication matrix for L1FAIL is
.998
.998
.99
.995
------------------
.355
.355
.99
.995
------------------
.413
.413
.99
.995
------------------

*********************
The implication matrix for L2FAIL is
.99
.995
.355
.355
------------------
.99
.995
.998
.998
------------------
.99
.995
.413
.413
------------------

*********************
The implication matrix for L1L2FAIL is
.413
.413
.413
.413
------------------
.413
.413
.413
.413
------------------

```
2.000004E-02
9.000003E-02
2.000004E-02
9.000003E-02
───────────────
*********************
Reasoned grade for 1 th parameter of the cause is
  .998   this is reasoned by rule 1
  .995   this is reasoned by rule 2
  .413   this is reasoned by rule 3
Reasoned grade for 2 th parameter of the cause is
  .355   this is reasoned by rule 1
  .995   this is reasoned by rule 2
  .413   this is reasoned by rule 3
Reasoned grade for 3 th parameter of the cause is
  .413   this is reasoned by rule 1
  .995   this is reasoned by rule 2
  9.000003E-02   this is reasoned by rule 3
The match between the result from rule 1 and cause 1 is      1
The match between the result from rule 1 and cause 2 is
                                                      .4749927
The match between the result from rule 1 and cause 3 is
                                                      .5260386
The match between the result from rule 2 and cause 1 is
                                                      .500556
The match between the result from rule 2 and cause 2 is
                                                      .500556
The match between the result from rule 2 and cause 3 is
                                                      .5247706
The match between the result from rule 3 and cause 1 is
                                                      .612737
The match between the result from rule 3 and cause 2 is
                                                      .612737
The match between the result from rule 3 and cause 3 is
                                                      .4826942
Dempster's combined possibility for L1FAIL is       1
Dempster's combined possibility for L2FAIL is       .7374305
Dempster's combined possibility for L1L2FAIL is     .7634256
```

The present invention is not limited to the particular embodiment described above, but can also be modified as exemplified in (i) through (iv) below:

(i) The method described above can be applied outside the power system field.

Figures 8, 9:
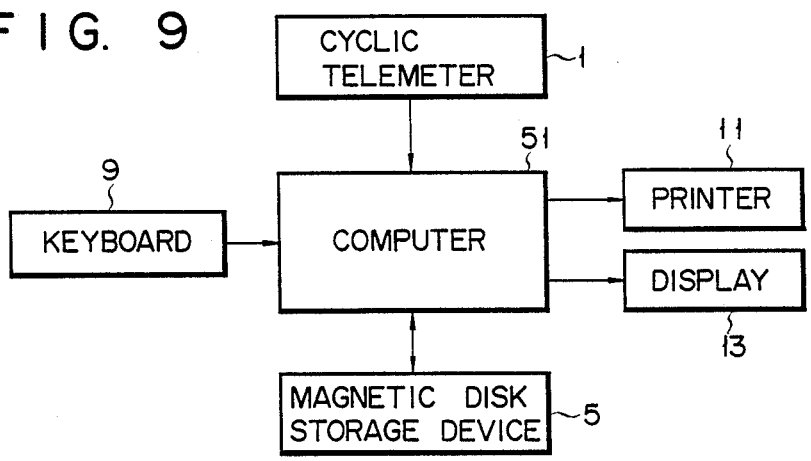
FIG. 8 is a table showing the cause/effect relationships entered at a keyboard and associated with an accident.
FIG. 9 is a block diagram of an accident analysis apparatus according to another embodiment of the present invention.

(ii) In the embodiment shown in FIG. 4, two computers are used for high-speed processing, However, one computer 51 may be used, as shown in FIG. 9.

(iii) In the table of FIG. 8, 1 or 0 is filled in all columns thereof. However, as shown in FIG. 10, columns for indefinite items can be left empty without using 1 or 0 to obtain the same effect as in the above embodiment.

(iv) The operated components such as LA1, LA2, ... are used as elements in FIG. 8. However, as shown in FIG. 10, nonoperated components such as LA1, LA2, ... are added to the operated components to form a table. In this case, "1" is used to express the operated or nonoperated components. For example, when the probability for opening relay LA1 is 90% or more, LA1 is given as "1"; and when the probability for not opening relay LA2 is 90% or more, LA2 is given as "1". The columns for nonassociated items and indefinite items are left empty. The same effect as in the above embodiment can be obtained using this table.

What is claimed is:

1. An apparatus for monitoring an accident occurring in an electric power system including at least logical switches and protective relays, on the basis of a Dempster & Shafer theory and a Fuzzy theory, wherein, assuming that elements constituting a phenomenon occurring in the electric power system are $A_i$ ($i=1, 2, \ldots$) which is a subset of a whole set $A_0 = \{a_1, a_2, \ldots a_n\}$, where $a_1, a_2, \ldots a_n$ represent states of logical switches or protective relays, the Dempster & Shafter theory defines the following:

basic probability $m(A_i)$ is $$m(\phi) = 0$$
$$\sum_{A_j \subset A_0} m(A_i) = 1;$$
($\phi$: empty set), and, when relationship $m(A_i) > 0$ stands, lower probability $P_*(A_i)$ is $$P_*(A_i) = \sum_{A_j \subset A_i} m(A_j)$$

and upper probability $P^*(A_i)$ is $$P^*(A_i) = 1 - P_*(\overline{A_i})$$
$$= 1 - \sum_{A_j \subset \overline{A_i}} m(A_j);$$

and, assuming that a whole set is U {u1, u2, ..., un}, where ui (i=1, 2, ... n) is any one of lower probability P*(Ai) and upper probability P*(Ai), and the Fuzzy set is F, the Fuzzy set defines the following:

$$F = \sum_{1}^{n} \{\mu F(ui)/ui\} = \mu F(u1)/u1 + \mu F(u2)/u2 + \ldots \mu F(un)/un$$

where $\mu F(ui)$ is the grade of ui in a membership function of U; "/" is the separator and "+" means "or"; when propositions represented by
Compound Proposition: if (X is F) then (y is G) and Propositions: (x if F') are given,
   y is G' for $G' = F'o[(F \times G) \cup (F \times V)]$ is inferred by the generalization of modus ponens, where each of F and F' is Fuzzy set in U and each of G and G' is Fuzzy set of V, which is a set of v1, v2, ... vm, where vj (j=1, 2, ... m) represents a cause of failure,
said apparatus comprising:
means for operating said electric power system in operating equipment types including
(1) Balanced-type dual-feeder system,
(2) Radial feeder system,
(3) Single feeder,
(4) Double bus,
(5) Single bus,
(6) Transformer,
(7) Center point grounding,
(8) Power-factor improvement and stabilizing equipment,
(9) 3-terminal balanced-type dual-feeder system, and
(10) 3-terminal single feeder;
first means for detecting operating conditions of said logical switches and said protective relays;
second means for creating a first list which lists, for each of said operating equipment types, cause/effect relationships including a plurality of causes of accidents that are empirically obtained, a plurality of effects associated with said causes, and basic probabilities of the respective effects, a sum of the basic probabilities being equal to 1; for creating a second list which lists logical switches and protective relays whose operating conditions have changed during time period t1 after detection of an accident; for creating a third list which lists logical switches and protective relays which are regarded as being associated with the accident among from those listed in said second list, when the occurrence of the accident is confirmed; for determining an operating equipment type of said electric power system from the logical switches and protective relays that are listed in said third list, and creating a fourth list in which names of logical switches of facilities that are regarded as being associated with the accident are related with those of logical switches of the operating equipment type as determined; for calculating any one of upper and lower probabilities for the cause/effect relationship listed in said first list, using the Dempster & Shafer theory, and producing a membership function; and for performing approximate reasoning by the use of the Fuzzy theory, on the names of the logical switches of the determined operating equipment type, using the membership function, to thereby infer facilities associated with the accident.

2. A method for monitoring an accident occurring in an electric power system including at least logical switches and protective relays, on the basis of a Dempster & Shafer theory and a Fuzzy theory,
wherein, assuming that elements constituting a phenomenon occurring in the electric power system are Ai (i=1, 2, ...) which is a subset of a whole set A0={a1, a2, ... an}, where a1, a2, ... an represent states of logical switches or protective relays, the Dempster & Shafer theory defines the following:
basic probability m(Ai) is $m(\phi)=0$
$\sum_{Aj \; A0} m(Ai) = 1;$
($\phi$: empty set), and, when relationshp m(Ai)>0 stands, lower probability P*(Ai) is $$P*(Ai) = \sum_{Aj \; Ai} m(Aj)$$

and upper probability $P^*(\overline{Ai})$ is $$P^*(Ai) = 1 - P_*(Ai)$$
$$= 1 - \sum_{Aj \; Ai} m(Aj);$$

and, assuming that a whole set is U {u1, u2, ..., un}, where ui (i=1, 2, ... n) is any one of lower probability P*(Ai) and upper probability P*(Ai), and the Fuzzy set is F, the Fuzzy set defines the following:

$$F = \sum_{1}^{n} \{\mu F(ui)/ui\} = \mu F(u1)/u1 + \mu F(u2)/u2 + \ldots \mu F(un)/un$$

where $\mu F(ui)$ is the grade of ui in a membership function of U; "/" is the separator, and "+" means "or"; when propositions represented by
Compound Proposition: if (X is F) then (y is G) and Proposition: (x is F') are given,
   y is G' for $G' = F'o[(F \times G) \cup (F \times V)]$ is inferred by the generalization of modus ponens, where each of F and F' is Fuzzy set in U and each of G and G' is Fuzzy set of V, which is a set of v1, v2, ... vm, where vj (j=1, 2, ... m) represents a cause of failure,
said method comprising:
a first step of operating said electric power system in operating equipment types including
(1) Balanced-type dual-feeder system,
(2) Radial feeder system,
(3) Single feeder,
(4) Double bus,
(5) Single bus,
(6) Transformer,
(7) Center point grounding,
(8) Power-factor improvement and stabilizing equipment,
(9) 3-terminal balanced-type dual-feeder system, and

(10) 3-terminal single feeder;

a second step of detecting operating conditions of said logical switches and said protective relays;

a third step of creating a first list which lists, for each of said operating equipment types, cause/effect relationships including a plurality of causes of accidents that are empirically obtained, a plurality of effects associated with said causes, and basic probabilities of the respective effects, a sum of the basic probabilities being equal to 1; of creating a second list which lists logical switches and protective relays whose operating conditions have changed during time period t1 after detection of an accident; of creating a third list which lists logical switches and protective relays that are regarded as being associated with the accident among from those listed in said second list, when the occurrence of the accident is confirmed; of determining an operating equipment type of said electric power from the logical switches and protective relays that are listed in said third list, and creating a fourth list in which names of logical switches of facilities that are regarded as being associated with the accident are related with those of logical switches of the operating equipment type as determined; of calculating any one of upper and lower probabilities for the cause/effect relationship listed in said first list, using te Dempster & Shafer theory, and producing a membership function; and of performing approximate reasoning by the use of the Fuzzy theory, on the names of the logical switches of the determined operating equipment type, using the membership function, to thereby infer facilities associated with the accident.

* * * * *

UNITED STATES PATENT AND TRADEMARK OFFICE
CERTIFICATE OF CORRECTION

PATENT NO. : 4,839,823
DATED : June 13, 1989
INVENTOR(S) : Yoshihiro MATSUMOTO

It is certified that error appears in the above-identified patent and that said Letters Patent is hereby corrected as shown below:

Claim 1, column 24, lines 50-62, text is printed upside down. Please print text correctly.

What is claimed is:
1. An apparatus for monitoring an accident occurring in an electric power system including at least logical switches and protective relays, on the basis of a Dempster & Shafer theory and a Fuzzy theory,
wherein, assuming that elements constituting a phenomenon occurring in the electric power system are $A_i$ ($i = 1, 2, \ldots$) which is a subset of a whole set $A_0 = \{a_1, a_2, \ldots a_n\}$, where $a_1, a_2, \ldots a_n$ represent states of logical switches or protective relays, the Dempster & Shafer theory defines the following basic probability $m(A_i)$ is

Signed and Sealed this

Twentieth Day of February, 1990

Attest:

JEFFREY M. SAMUELS

*Attesting Officer*  *Acting Commissioner of Patents and Trademarks*